(12) United States Patent
Ryi et al.

(10) Patent No.: US 10,978,728 B2
(45) Date of Patent: Apr. 13, 2021

(54) METHOD FOR PRODUCING HIGH-PURITY ELECTROLYTE FOR VANADIUM REDOX FLOW BATTERY USING CATALYTIC REACTOR

(71) Applicant: KOREA INSTITUTE OF ENERGY RESEARCH, Daejeon (KR)

(72) Inventors: Shin-kun Ryi, Sejong-si (KR); Myung-seok Jeon, Daejeon (KR); Jae Yun Han, Daejeon (KR); Chang-Hyun Kim, Yangju-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 166 days.

(21) Appl. No.: 16/382,599

(22) Filed: Apr. 12, 2019

(65) Prior Publication Data

US 2020/0328447 A1   Oct. 15, 2020

(51) Int. Cl.
| | |
|---|---|
| *H01M 8/18* | (2006.01) |
| *H01M 8/04223* | (2016.01) |
| *H01M 8/04119* | (2016.01) |
| *H01M 8/065* | (2016.01) |

(52) U.S. Cl.
CPC ....... *H01M 8/188* (2013.01); *H01M 8/04164* (2013.01); *H01M 8/04179* (2013.01); *H01M 8/04231* (2013.01); *H01M 8/065* (2013.01)

(58) Field of Classification Search
CPC .. H01M 8/188; H01M 8/04231; H01M 8/065; H01M 8/04179; H01M 8/04164
See application file for complete search history.

(56) References Cited

FOREIGN PATENT DOCUMENTS

| JP | 2994210 B2 | 12/1999 |
|---|---|---|
| JP | 20138640 A | 1/2013 |
| KR | 1020130107845 A | 10/2013 |

OTHER PUBLICATIONS

Korean Notice of Allowance for KR Application No. 10-2018-0041739 dated Aug. 30, 2019, citing the above reference(s).

*Primary Examiner* — Osei K Amponsah
(74) *Attorney, Agent, or Firm* — Cantor Colburn LLP

(57) ABSTRACT

The present invention relates to a method for producing a 3- to 3.5-valent vanadium solution from a 4-valent vanadium solution by a catalytic reaction in the presence of a reducing agent, which generates a gas product during oxidation; a method for producing an electrolyte for a vanadium redox flow battery; and an apparatus for producing a liquid electrolyte for a vanadium redox flow battery. The present invention is characterized in that when a 3- to 3.5-valent vanadium electrolyte is produced from a 4-valent vanadium electrolyte by a catalytic reaction in the presence of a reducing agent, which generates a gas product during oxidation, the gas product produced in the catalytic reaction is captured with inert gas bubbles, which are carrier gases, and is removed from the reaction solution of the catalytic reaction by gas-liquid phase separation, thereby accelerating the catalytic reaction towards the forward reaction.

9 Claims, 5 Drawing Sheets

METHOD FOR PRODUCING HIGH-PURITY ELECTROLYTE FOR VANADIUM REDOX FLOW BATTERY USING CATALYTIC REACTOR

TECHNICAL FIELD

The present invention relates to a method for producing a 3- to 3.5-valent vanadium solution from a 4-valent vanadium solution by a catalytic reaction in the presence of a reducing agent, which generates a gas product during oxidation; a method for producing an electrolyte for a vanadium redox flow battery; and an apparatus for producing a liquid electrolyte for a vanadium redox flow battery.

BACKGROUND

Recently, as a way to combat global warming, the introduction of new energy, such as solar photovoltaic power generation and wind power generation, has been promoted throughout the world. Since the output of such power generation is affected by the weather, it is predicted that when the power generation is introduced on a large scale, there will be problems with the operation of power systems, such as difficulty in maintaining frequencies and voltages. The most important issue in the current power system is to precisely predict the demand and to run the generator at the right time. However, it is not easy to regulate the amount of power generated. Accordingly, introduction of power storage devices that will act as a buffer between power generation capacity, consumption, and demand will be needed.

As a way to solve such problems, redox flow batteries (RFB) have gained much attention. A redox flow battery is a very efficient technology for power storage because it can increase the amount of power stored by a simple method of increasing the amount of electrolytes.

In a redox flow battery, a positive electrode electrolyte and a negative electrode electrolyte are supplied to a battery cell having a membrane interposed between a positive electrode and a negative electrode to charge and discharge the battery. An aqueous solution containing a water-soluble metal ion, whose valence is varied by oxidation/reduction, is typically used as the electrolyte, and such a metal ion is used as an active material.

Such redox flow batteries include Cr/Cr, V/Sn, V/Fe, and V/V according to redox couples.

The redox flow batteries have the same ability to store intermittent energy supply and demand as other batteries, and also have advantages in that they have a small change in capacity to store energy over time and can produce electricity by immediately causing the reaction when needed. Until now, the redox flow batteries have had disadvantages in that they are large in size, expensive, and difficult to control at suitable temperatures. However, through the use of an all-vanadium redox flow battery (VRB), the issues of lifetime, reaction time, and charge/discharge efficiency have been resolved.

In a vanadium redox flow battery (VRFB), an electrolyte accounts for the highest proportion of the battery components (1 MW/8 MWh system electrolyte price ratio: 52%). Therefore, low-cost electrolytes are essential for securing the price competitiveness of VRFB.

In a currently-used VRFB system, a 3.5-valent ($VO^{2+}$/$V^{3+}$=1/1) electrolyte is injected into the positive electrode and the negative electrode of a VRFB cell to drive the system, and thus it is necessary to develop a low-cost and high-purity 3.5-valent electrolyte to be used commercially.

The electrolyte for VRFB is produced using $V_2O_5$, which has the lowest price among various vanadium oxide precursors ($V_2O_5$, $V_2O_3$, $VOSO_4$). $V_2O_5$ is dissolved in a sulfuric acid solution to prepare a 5-valent electrolyte ($VO_2^+$), which is then reduced to a 4-valent electrolyte ($VO^{2+}$) using oxalic acid. However, when oxalic acid is additionally added, the reduction to a 3-valent electrolyte ($V^{3+}$) does not occur, whereas when an excessive amount of oxalic acid is added, there is a problem in that the electrolyte may precipitate.

There are two techniques that are being employed to prepare a 3.5-valent electrolyte by reducing a 4-valent electrolyte. In a first technique, 3-valent and 5-valent electrolytes are produced by charging a 4-valent electrolyte via electrolysis using a stack. However, there is a problem in that ⅓ of the electrolyte is wasted because excess 5-valent electrolyte is produced. In addition, stack installation, power consumption, operation, and repair costs are incurred, which causes an increase in the production cost of the electrolytes. In a second technique, a 4-valent electrolyte is reduced to a 3-valent electrolyte by adding a metal having a strong reducing power such as Zn via a chemical reduction using a reducing agent. However, there is a problem in that large amounts of $Zn^{2+}$ impurities are contained in the electrolyte, resulting in an increase in the process cost for removing the impurities, or causing a problem of deteriorating VRFB efficiency due to Zn deposition.

Therefore, in order to reduce the cost of the vanadium redox flow battery, there is a need for a technique for producing a 3.5-valent vanadium electrolyte that can avoid the use of electrolysis without forming impurities using a $V_2O_5$ precursor.

SUMMARY

Technical Problem

The present invention is essentially intended to solve the problems encountered in a conventional production process of electrolytes using electrolysis or a metal reducing agent in which excess 5-valent electrolyte (50% of the 3.5-valent electrolyte production) is produced, or the electrolyte efficiency is deteriorated since large amounts of metal ions are contained as impurities.

Accordingly, the present invention is intended to investigate for the first time and solve the problems associated with the inflow of oxygen into a catalytic reactor when producing a 3- to 3.5-valent vanadium electrolyte by reducing a 4-valent vanadium electrolyte in the presence of a reducing agent and a catalyst.

Technical Solution

A first aspect of the present invention provides a method for producing an electrolyte for a vanadium redox flow battery, including:

a first step of purging the interior of a first vessel for supplying a 4-valent vanadium solution accommodating a 4-valent vanadium solution with an inert purge gas to prevent oxidation of the 4-valent vanadium solution;

a second step of supplying the inert gas which escaped from the first vessel for supplying a 4-valent vanadium solution after the first step into the interior of a catalytic reactor, in which a 3- to 3.5-valent vanadium solution is produced from the 4-valent vanadium solution by a catalytic reaction in the presence of a reducing agent, which generates a gas product during oxidation, and capturing the gas product of the catalytic reaction with gas bubbles, followed by subjecting the gas product to gas-liquid phase separation from the reaction solution of the catalytic reaction, thereby accelerating the catalytic reaction towards the forward reaction; and a third step of purging a second vessel for supplying a 3- to 3.5-valent vanadium solution accommodating a 3- to 3.5-valent vanadium solution with a mixed gas of the inert gas and the gas product of the catalytic reaction captured with gas bubbles by the inert gas in the second step, which escaped to the exterior of the catalytic reactor in a gas state, to prevent oxidation of the 3- to 3.5-valent vanadium solution, followed by discharging the mixed gas to the exterior of the second vessel.

A second aspect of the present invention provides an apparatus for producing a liquid electrolyte for a vanadium redox flow battery, including:

(i) a first vessel for supplying a 4-valent vanadium solution, which includes an inlet and outlet for an inert purge gas and accommodates a 4-valent vanadium solution, wherein the first vessel for supplying a 4-valent vanadium solution is purged with an inert gas to prevent oxidation, followed by discharging the inert purge gas to the exterior of the vessel;

(ii) a catalytic reactor, which includes an inert gas inlet connected to the outlet for an inert purge gas of the first vessel for supplying a 4-valent vanadium solution, and an outlet for a mixed gas containing an inert gas and a gas product of a catalytic reaction, and produces a 3- to 3.5-valent vanadium solution from the 4-vanadium solution by a catalytic reaction in the presence of a reducing agent, which generates a gas product during oxidation, wherein the inert purge gas discharged from the first vessel for supplying a 4-valent vanadium solution is supplied to the interior of the catalytic reactor, and the gas product of the catalytic reaction is captured with gas bubbles and subjected to gas-liquid phase separation, thereby accelerating the catalytic reaction towards the forward reaction; and (iii) a second vessel for supplying a 3- to 3.5-valent vanadium solution, which includes an inlet for the mixed gas connected to the outlet for the mixed gas of the catalytic reactor containing the inert gas and the gas product of the catalytic reaction, and accommodates a 3- to 3.5-valent vanadium liquid solution;

wherein the second vessel for supplying a 3- to 3.5-valent vanadium solution is purged with the mixed gas containing the inert gas and the gas product of the catalytic reaction which escaped to the exterior of the catalytic reactor, to prevent oxidation of the 3- to 3.5-valent vanadium solution.

A third aspect of the present invention provides a method for producing a 3- to 3.5-valent vanadium solution from a 4-valent vanadium solution by a catalytic reaction in the presence of a reducing agent, which generates a gas product during oxidation, wherein the gas product produced in the catalytic reaction is captured with inert gas bubbles, which are carrier gases, and is removed from the reaction solution of the catalytic reaction by gas-liquid phase separation, thereby accelerating the catalytic reaction towards the forward reaction.

DETAILED DESCRIPTION

Figure 1:
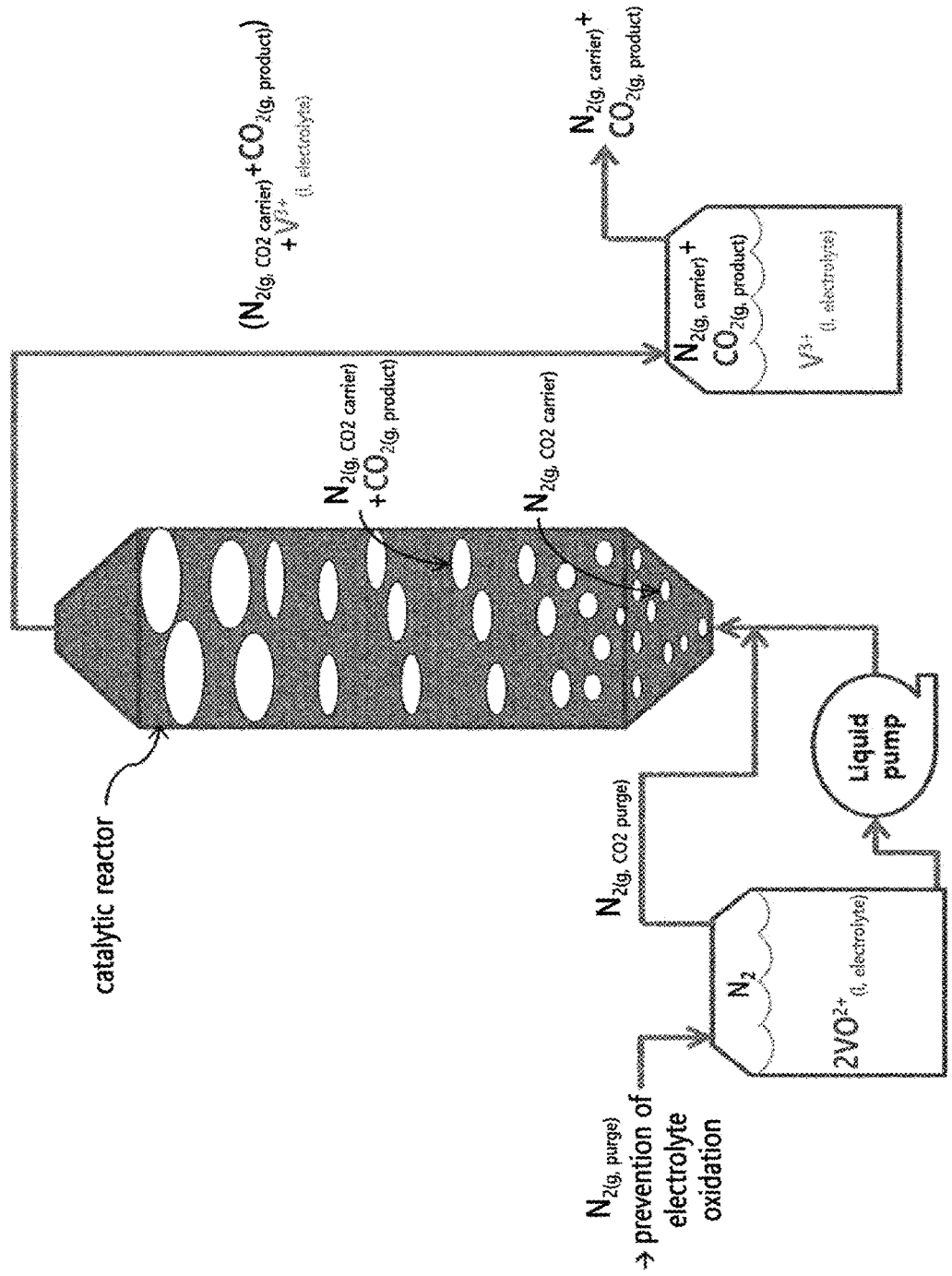
FIG. 1 is a conceptual diagram of the process for producing a 3.5-valent vanadium electrolyte using a catalytic reactor according to an embodiment of the present invention.

Hereinafter, the present invention will be described in detail.

The electrolyte for a vanadium redox flow battery is an energy storage material used in a vanadium chemical flow battery, and is an electrolyte for a secondary battery that stores and discharges power by an oxidation/reduction reaction of vanadium ions.

The present invention relates to a method for producing a 3- to 3.5-valent vanadium electrolyte from a 4-valent vanadium electrolyte by a catalytic reaction in the presence of a reducing agent, which generates a gas product during oxidation, which is characterized in that the gas product produced in the catalytic reaction is captured with inert gas bubbles, which are carrier gases, and is removed from the reaction solution of the catalytic reaction by gas-liquid phase separation, thereby accelerating the catalytic reaction towards the forward reaction.

The present invention has been first implemented to investigate for the first time and solve the problem associated with the inflow of oxygen into a catalytic reactor when producing a 3- to 3.5-valent vanadium electrolyte by reducing a 4-valent vanadium electrolyte in the presence of a reducing agent and a catalyst.

Oxygen is easily oxidizes chemical substances. The present inventors have investigated for the first time the problem that when oxygen is introduced into a 3-valent vanadium-containing electrolyte in the presence of a catalyst for reducing 4-valent vanadium to 3-valent vanadium, a side reaction occurs in which the 3-valent vanadium is oxidized to 4-valent vanadium, and thus the vanadium valence of the produced electrolyte becomes higher than 3.5. That is, the present inventors have found that when a 3-valent electrolyte is exposed to the air in the presence of a catalyst (e.g., PtRu/C) for reducing 4-valent vanadium, the electrolyte is oxidized to a 4-valent electrolyte, but if the catalyst is absent, it is stably maintained as the 3-valent electrolyte.

Nitrogen is fundamentally a non-reactive gas. Nitrogen purging makes the atmosphere of a reaction become 100% nitrogen under normal air conditions. In order to solve the problem of the oxidation of 3-valent vanadium to 4-valent vanadium, the present inventors have made an attempt to purge the catalytic reactor containing a catalyst for reducing the 4-valent vanadium to 3-valent vanadium with an inert gas (e.g., nitrogen), and have found that, at this time, the gas product produced in the catalytic reaction is captured with inert gas bubbles, which are carrier gases, and is removed from the reaction solution of the catalytic reaction by gas-liquid phase separation, thereby accelerating the catalytic reaction towards the forward reaction. Based on these findings, the present invention has been designed to provide an apparatus and method for producing an electrolyte for a vanadium redox flow battery.

Accordingly, the method for producing an electrolyte for a vanadium redox flow battery according to the present invention includes:

a first step of purging the interior of a first vessel for supplying a 4-valent vanadium solution accommodating a 4-valent vanadium solution with an inert purge gas to prevent oxidation of the 4-valent vanadium solution;

a second step of supplying the inert gas which escaped from the first vessel for supplying a 4-valent vanadium solution after the first step into the interior of a catalytic reactor, in which a 3- to 3.5-valent vanadium solution is produced from the 4-valent vanadium solution by a catalytic reaction in the presence of a reducing agent, which generates a gas product during oxidation, and capturing the gas product of the catalytic reaction with gas bubbles, followed by subjecting the gas product to gas-liquid phase separation from the reaction solution of the catalytic reaction, thereby accelerating the catalytic reaction towards the forward reaction; and a third step of purging a second vessel for supplying a 3- to 3.5-valent vanadium solution accommodating a 3- to 3.5-valent vanadium solution with a mixed gas of the inert gas and the gas product of the catalytic reaction captured with gas bubbles by the inert gas in the second step, which escaped to the exterior of the catalytic reactor in a gas state, to prevent oxidation of the 3- to 3.5-valent vanadium solution, followed by discharging the mixed gas to the exterior of the second vessel.

At this time, as illustrated in FIG. 1, the first step to third step may be carried out in a continuous process in terms of gas flow.

In addition, as illustrated in FIG. 1, the 4-valent vanadium solution may be supplied to the catalytic reactor of the second step from the first vessel for supplying a 4-valent vanadium solution, in which the oxidation is prevented by an inert purge gas in the first step, and/or the 3- to 3.5-valent vanadium solution produced in the catalytic reactor of the second step may be supplied to the second vessel for supplying a 3- to 3.5-valent vanadium solution of the third step.

Further, as illustrated in FIG. 1, the gas product of the catalytic reaction, which is captured with gas bubbles by the inert gas, and the 3- to 3.5-valent vanadium solution produced in the catalytic reaction in the second step may be supplied to the second vessel for supplying a 3- to 3.5-valent vanadium solution from the catalytic reactor and subjected to gas-liquid separation, and the second vessel for supplying a 3- to 3.5-valent vanadium solution may be purged with the mixed gas of the inert gas and the gas product of the catalytic reaction to prevent oxidation of the 3- to 3.5-valent vanadium solution, and subsequently, the mixed gas may be discharged to the exterior of the second vessel. That is, the gas product of the catalytic reaction is captured with the inert gas by mixing of gases in the step 2 to allow the gas product to escape to the exterior in a gas state, and thus the gas product is moved upwards in the catalytic reactor and discharged to the exterior of the catalytic reactor at a higher rate than the 3- to 3.5-valent vanadium solution in a liquid state, which is the product of the catalytic reaction.

Furthermore, the apparatus for producing a liquid electrolyte for a vanadium redox flow battery according to the present invention includes:

(i) a first vessel for supplying a 4-valent vanadium solution, which includes an inlet and outlet for an inert purge gas and accommodates a 4-valent vanadium solution, wherein the first vessel for supplying a 4-valent vanadium solution is purged with an inert gas to prevent oxidation, followed by discharging the inert purge gas to the exterior of the vessel;

(ii) a catalytic reactor, which includes an inert gas inlet connected to the outlet for an inert purge gas of the first vessel for supplying a 4-valent vanadium solution, and an outlet for a mixed gas containing an inert gas and a gas product of a catalytic reaction, and produces a 3- to 3.5-valent vanadium solution from the 4-vanadium solution by a catalytic reaction in the presence of a reducing agent, which generates a gas product during oxidation, wherein the inert purge gas discharged from the first vessel for supplying a 4-valent vanadium solution is supplied to the interior of the catalytic reactor, and the gas product of the catalytic reaction is captured with gas bubbles and subjected to gas-liquid phase separation, thereby accelerating the catalytic reaction towards the forward reaction; and (iii) a second vessel for supplying a 3- to 3.5-valent vanadium solution, which includes an inlet for the mixed gas connected to the outlet for the mixed gas of the catalytic reactor containing the inert gas and the gas product of the catalytic reaction, and accommodates a 3- to 3.5-valent vanadium liquid solution;

wherein the second vessel for supplying a 3- to 3.5-valent vanadium solution is purged with the mixed gas containing the inert gas and the gas product of the catalytic reaction which escaped to the exterior of the catalytic reactor, to prevent oxidation of the 3- to 3.5-valent vanadium solution.

The method for producing an electrolyte for a vanadium redox flow battery according to the present invention may be carried out using the apparatus for producing a liquid electrolyte for a vanadium redox flow battery according to the present invention.

Typically, the redox flow battery includes a positive electrode cell including a positive electrode; a negative electrode cell including a negative electrode; a separation membrane that separates the positive electrode cell and the negative electrode cell; and a positive electrode electrolyte and a negative electrode electrolyte supplied to the positive electrode cell and the negative electrode cell, respectively.

The electrolyte may be a solution using water or an organic solvent as a solvent. Non-limiting examples of the organic solvent include acetone, isopropyl alcohol (IPA), ethanol, methanol, and the like.

A vanadium-based compound may be used as an active material used in the electrolyte.

When the redox flow battery uses a V/V redox couple, the negative electrode electrolyte has vanadium ions having an oxidation number of +3, and the positive electrode electrolyte has vanadium ions having an oxidation number of +4, thereby providing a redox flow battery having high charge/discharge efficiency.

The electrolyte may further include metal ions other than the vanadium metal component to improve the availability of the vanadium ions.

The concentration of the positive active material solution and the concentration of the negative active material solution may independently be from 1 M to 10 M. When the concentration of the active material solution is within the above range, there may be advantages of a high energy density and a high power density. When the concentration of the active material solution is lower than 1 M, the amount of the active material per unit volume is low, so that the energy density is lowered, whereas when the active material solution concentration is higher than 10 M, the viscosity of the active material solution increases sharply, and the rate of oxidation/reduction reaction markedly decreases, which decreases power density.

The vanadium precursor may be present in an oxidized state, such as V(II), V(III), $VO^{2+}$(IV), $VO_2^+$(V), or the like in an aqueous solution. Commonly used vanadium precursors include $VCl_3$, $V_2O_5$, and $VOSO_4$.

The vanadium precursor, which can form a 4-valent vanadium ion, forms a 4-valent vanadium ion when dissolved in water, and for example, $VOSO_4$ may be used. For example, a 4-valent vanadium solution may contain $VO^{2+}$.

breakthrough, the reducing agent used in the present invention may preferably generate a gas product (e.g., $CO^2$) during oxidation in the presence of a catalyst.

Non-limiting examples of the oxidation reaction of the reducing agent in the presence of a catalyst and the reduction reaction from the 4-valent vanadium to the 3-valent vanadium include the following Reaction Schemes 1 and 2.

[Reaction Scheme 1]

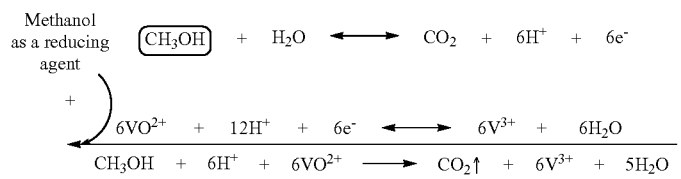

The method for producing a 3- to 3.5-valent vanadium solution from a 4-valent vanadium solution in the presence of a reducing agent according to the present invention may provoke a reduction reaction from $V^{4+}$ to $V^{3+}$ using a reducing agent, such as oxalic acid, formic acid, methanol, hydrogen, or the like, which does not leave impurities or residues after the reaction. These reducing agents do not provoke a reduction to 3-valent vanadium due to high activation energy, although such a reduction is thermodynamically valid, since the change in Gibbs free energy is negative.

Thus, the present invention uses a catalyst so as to lower the activation energy of the vanadium reduction reaction during the production of the 3- to 3.5-valent vanadium solution from the 4-valent vanadium solution. A non-limiting example of the catalyst that promotes the 3-valent reaction by lowering the activation energy includes a catalyst for a negative electrode in the field of fuel cells. As demonstrated in methanol and formic acid fuel cells, platinum or platinum-ruthenium alloy catalysts are excellent oxidation catalysts for many fuels including methanol, formic acid, hydrogen, and the like.

When the oxidation reaction of a reducing agent and the reduction reaction from 4-valent vanadium to 3-valent vanadium in a liquid vanadium solution in the presence of a catalyst occur together with the removal of gas products (e.g., $CO_2$) generated during the oxidation of the reducing agent, the oxidation reaction of a reducing agent and the reduction reaction from 4-valent vanadium to 3-valent vanadium in a liquid vanadium solution in the presence of a catalyst, can accelerate the rate of the forward reaction of the catalytic reaction by equilibrium breakthrough as the gas products of the catalytic reaction are removed.

For this purpose, the present invention is characterized in that an inert gas, which is a carrier gas, is introduced into a catalytic reactor accommodating a liquid vanadium solution, in which the oxidation reaction of a reducing agent and the reduction reaction from 4-valent vanadium to 3-valent vanadium occur in the presence of a catalyst and the gas product produced in the catalytic reaction is captured with gas bubbles and is removed from the reaction solution by gas-liquid phase separation. At this time, a side reaction in which the 3-valent vanadium is oxidized to the 4-valent vanadium by a catalyst may be prevented by purging the catalytic reactor with the inert gas.

In order to exert the effect of accelerating the rate of the forward reaction of the catalytic reaction by the equilibrium

[Reaction Scheme 2]

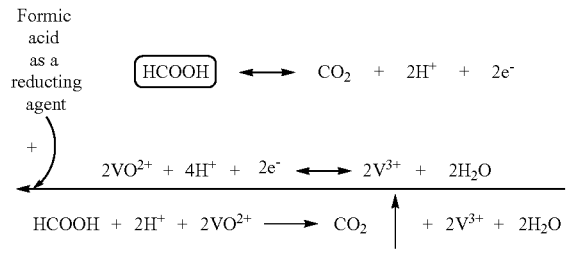

Meanwhile, non-limiting examples of the inert gas include $N_2$, $CO_2$, vapor, and the like.

As the inert gas bubbles, which are carrier gases, capture the gas product of the catalytic reaction, the size of the gas bubbles is increased and the surface area and the density of the gas bubbles are decreased, thereby generating or increasing the driving force for moving the gas bubbles upwards by differences in density.

The 4-valent vanadium solution may contain $VO^{2+}$, for example, it may contain $VOSO_4$. The 4-valent vanadium electrolyte containing $VO^{2+}$ may be produced by reducing $V_2O_5$, which has the lowest price among the vanadium oxide precursors ($V_2O_5$, $V_2O_3$, $VOSO_4$), with a reducing agent.

As illustrated in FIG. 1, in the method for producing an electrolyte for a vanadium redox flow battery, the inert gas (e.g., nitrogen) which escaped from the first vessel for supplying a 4-valent vanadium solution after the first step may be supplied to the catalytic reactor of the second step to purge the gas product (e.g., $CO_2$) produced from the catalytic reaction, and then may be supplied to the second vessel for supplying a 3- to 3.5-valent vanadium solution. When the inert gas is supplied to each of the vessels and the reactor alone, two more apparatuses may be required to supply the inert gas, but only one apparatus for supplying the inert gas may be needed when the inert gas is sequentially supplied to the first vessel—catalytic reactor—second vessel.

In the present invention, the second vessel for supplying a 3- to 3.5-valent vanadium solution may be an air-tight vessel. As illustrated in FIG. 1, the 3- to 3.5-valent vanadium solution produced in the catalytic reactor and the mixed gas of the inert gas and the gas product of the catalytic reaction, which escaped to the exterior of the catalytic reactor, may be supplied to the second vessel for supplying a 3- to 3.5-valent vanadium solution, and the second vessel for supplying a 3- to 3.5-valent vanadium solution may be purged with the mixed gas, thereby producing a purged 3- to 3.5-valent vanadium solution in the second vessel, while containing the mixed gas and the 3- to 3.5-valent vanadium solution in the air-tight vessel in a state of being subjected to gas-liquid separation.

In order to increase the efficiency of the catalytic reaction, a micro-channel reactor, as well as a tube-type fixed bed reactor may be used as a catalytic reactor.

The present invention may prepare a 3.5-valent electrolyte from a $V_2O_5$ precursor at a production rate of 40 L/h (1000 L/day) using a catalytic reactor. In addition, the 3.5-valent vanadium electrolyte produced according to the present invention may be applied to a commercial vanadium redox battery by realizing excellent electrochemical performance compared to a commercial vanadium electrolyte.

Figure 5:
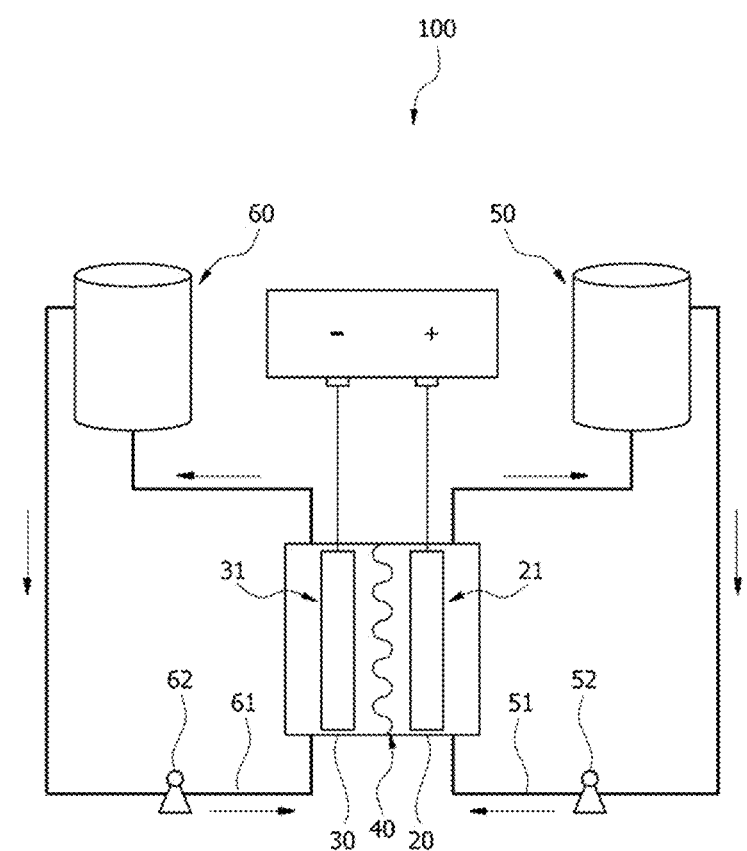
FIG. 5 is a structural diagram showing the structure of the redox flow battery.

For example, the basic configuration of the redox flow battery will be described with reference to FIG. 5.

The redox flow battery 100 is representatively connected to a power generation unit (e.g., a solar photovoltaic power generator, a wind power generator, or a common power plant) and to a load such as a power system or a consumer through an alternating current/direct current converter, and is charged by the power generation unit as a power supply source, and discharged to provide power to the load. To be charged and discharged, a battery system including the redox flow battery 100 and a circulation mechanism (tanks, pipes, pumps) for circulating an electrolyte through the battery 100 is constructed. The redox flow battery 100 includes a positive electrode cell 20 having a positive electrode 21 therein, a negative electrode cell 30 having a negative electrode 31 therein, and a separation membrane separating the two cells 20 and 30, for example, an ion exchange membrane 40 through which ions can be selectively permeated. The positive electrode cell 20 is connected to a tank 50 for a positive electrode electrolyte through a pipe 51. The negative electrode cell 30 is connected to a tank 60 for a negative electrode electrolyte through a pipe 61. The pipes 50, 60 include pumps 52, 62 for circulating the electrolytes of each electrode, respectively. In the redox flow battery 100, the positive electrode electrolyte in the tank 50 and the negative electrode electrolyte in the tank 60 are supplied by circulation to the positive electrode cell 20 (positive electrode 21) and negative electrode cell 30 (negative electrode 131) through the pipes 51, 61 and the pumps 52, 53, to charge and discharge the battery according to a valence change reaction of the metal ions serving as active materials in the electrolytes of each electrode. At this time, the ion exchange membrane 40 of the redox flow secondary battery 100 may be formed of nafion. In addition, the negative electrode 31 and the positive electrode 21 may be those uniformly coated with a carbon layer on a porous metal surface. For example, a carbon felt may be used, and platinum may be used as a counter electrode.

Advantageous Effects

The present invention can continuously prepare electrolytes without producing excessive 5-valent electrolytes and residues of the reducing agent, unlike conventional multi-step electrolyte production methods (electrolysis and metal reduction process). Thus, the redox flow battery of the present invention can be used as a large-scale energy storage device.

Further, the present invention can solve the social problems caused by a climate change, together with $CO_2$ reduction, as the application of new and renewable energy has been expanded by the reduction in the cost of the large-scale energy storage device.

Detailed Description of the Embodiments

Hereinafter, the present invention will be described in more detail by way of Examples. However, these Examples are given for illustrative purposes only, and the scope of the invention is not intended to be limited by these Examples.

Figure 2:
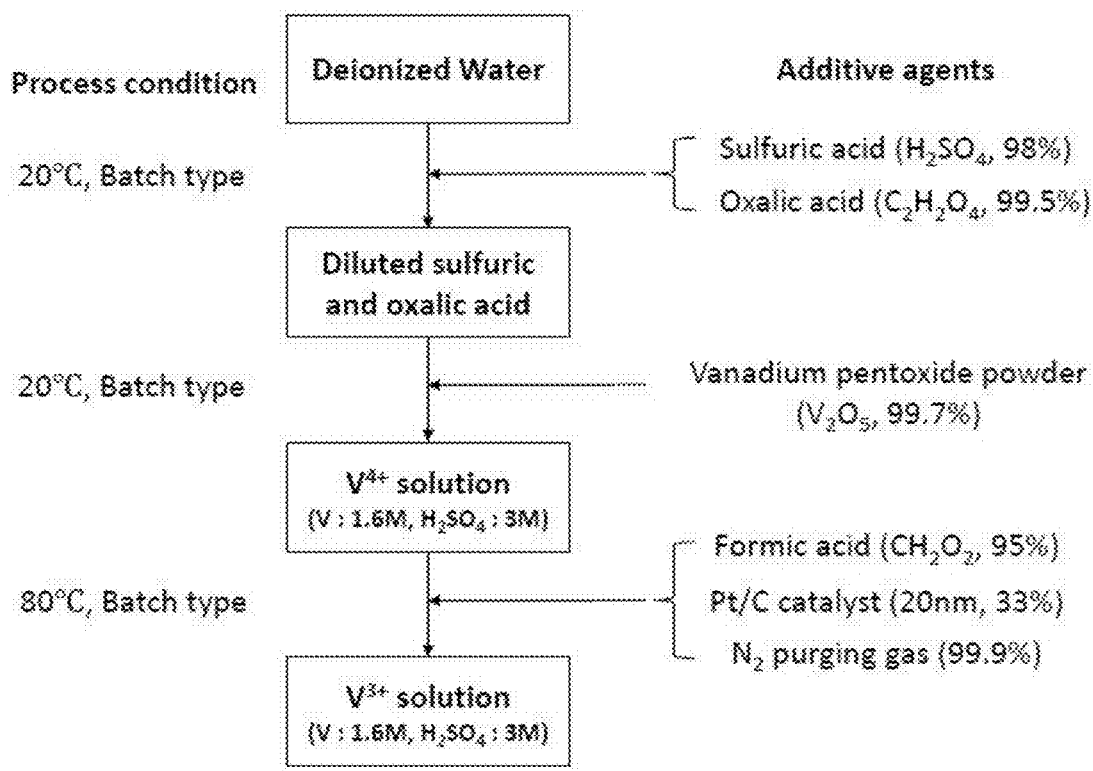
FIG. 2 is a diagram showing the process of producing a vanadium electrolyte according to Example 1.

Example 1: Production of Electrolyte Containing 3-Valent Vanadium ($V^{3+}$) Through Catalytic Reaction An electrolyte containing 3-valent vanadium was produced from a 4-valent vanadium electrolyte in the order shown in FIG. 2.

Specifically, diluted sulfuric acid and oxalic acid aqueous solutions were prepared by adding sulfuric acid (98%) and oxalic acid (99.5%) to deionized water at 20° C. Hereto, $V_2O_5$ powder (99.7%) was added to prepare a 4-valent vanadium ($V^{4+}$) aqueous solution (V: 1.6 M, $H_2SO_4$: 3 M), and subsequently, formic acid (95%) and a Pt/C catalyst (20 nm, 33%) were added, while purging with nitrogen gas (99.9%) at 80° C., to prepare an aqueous solution (V: 1.6 M, $H_2SO_4$: 3 M) containing 3-valent vanadium ($V^{3+}$).

Comparative Example 1: Production of Electrolyte Containing 3-Valent Vanadium ($V^{3+}$) Through Catalytic Reaction An aqueous solution (V: 1.6 M, $H_2SO_4$: 3 M) containing 3-valent vanadium ($V^{3+}$) was produced in the same manner as in Example 1, except that purging with nitrogen gas was omitted.

[Experimental Results]

Figure 3:
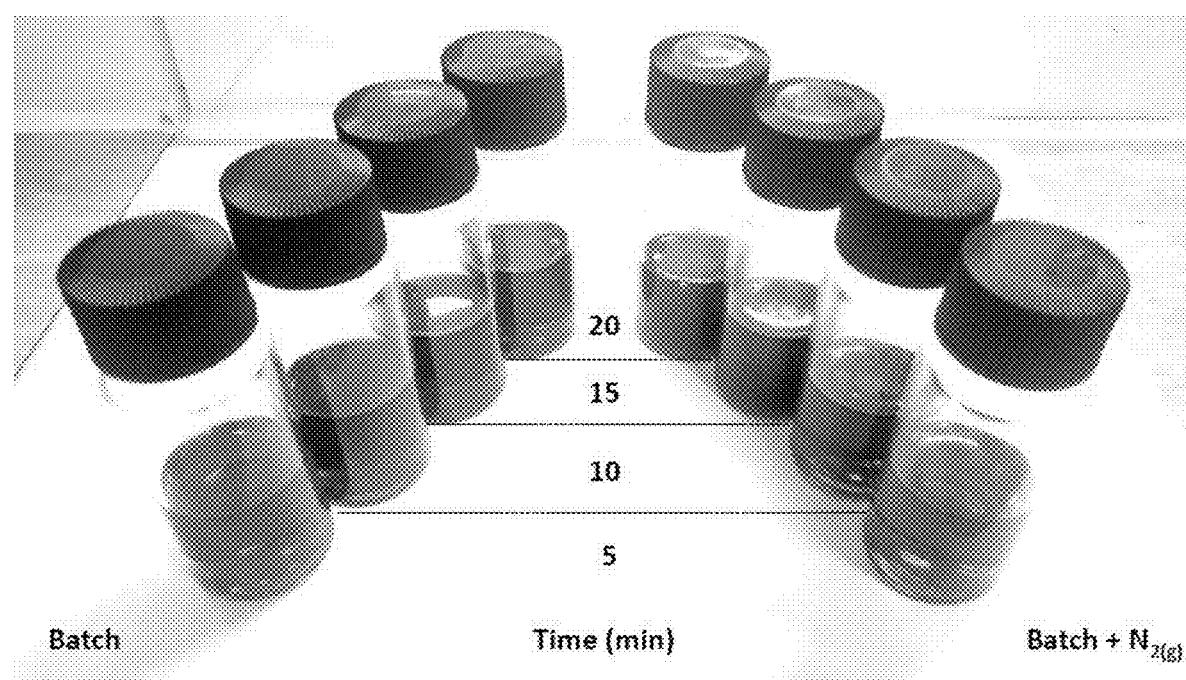
FIG. 3 is an image of the vanadium electrolytes according to Example 1 and Comparative Example 1 after production.
Figure 4:
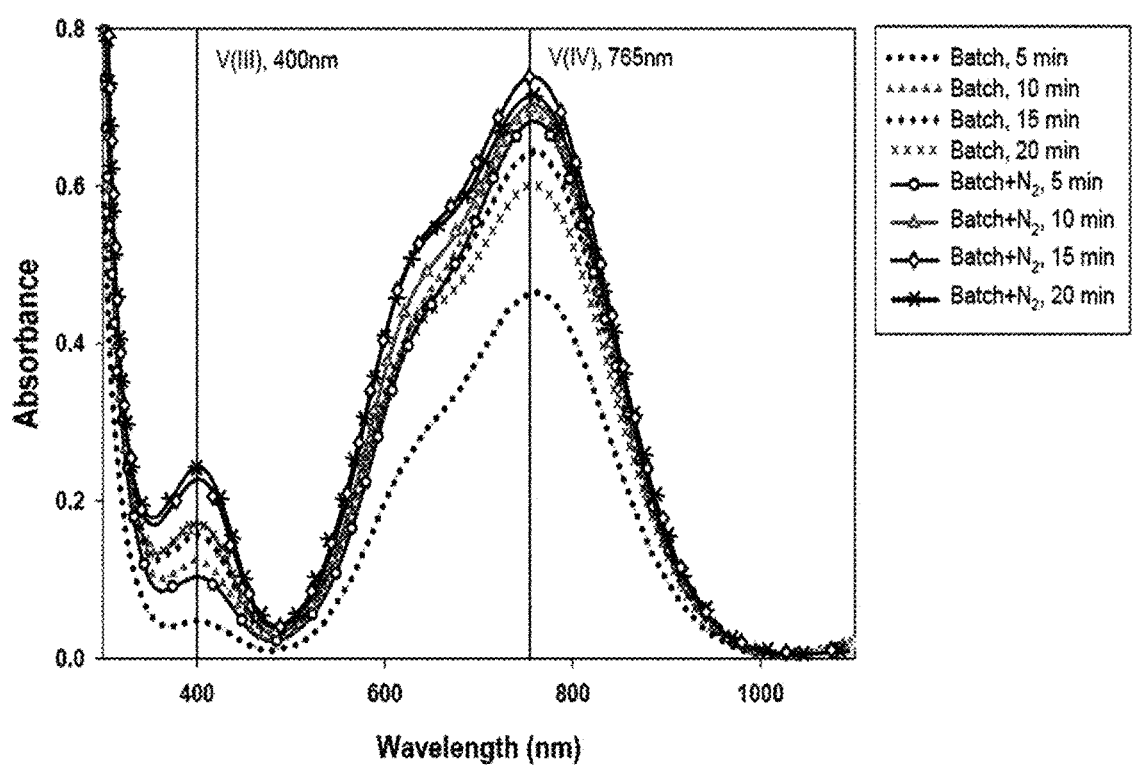
FIG. 4 is a graph showing the results of UV-VIS analysis (absorbance) after producing the vanadium electrolyte according to Example 1 and Comparative Example 1.

The image of the samples collected with time during the preparation of aqueous solutions containing 3-valent vanadium trivalent ($V^{3+}$) according to Example 1 and Comparative Example 1 and UV-VIS analysis results (absorbance) thereof are shown in FIGS. 3 and 4.

Further, Table 1 shows the average valence of vanadium in the vanadium aqueous solutions with time from the absorbance shown in FIG. 4.

TABLE 1

| Type Time (min) | Comparative Example 1 (Batch) | Example 1 (Batch + $N_{2(g)}$) |
|---|---|---|
| 0 | 4 | 4 |
| 5 | 3.85 | 3.79 |
| 10 | 3.76 | 3.7 |
| 15 | 3.7 | 3.65 |
| 20 | 3.66 | 3.63 |

Based on FIGS. 3 and 4, and Table 1, it can be confirmed that the catalytic reaction, in which 4-valent vanadium is reduced to 3-valent vanadium using formic acid, which is a reducing agent that generates carbon dioxide during oxidation, is accelerated toward the forward reaction by nitrogen purging during the reaction.

What is claimed is:

1. A method for producing an electrolyte for a vanadium redox flow battery, comprising:
    a first step of purging the interior of a first vessel for supplying a 4-valent vanadium solution accommodating a 4-valent vanadium solution with an inert purge gas to prevent oxidation of the 4-valent vanadium solution;

a second step of supplying the inert gas which escaped from the first vessel for supplying a 4-valent vanadium solution after the first step into the interior of a catalytic reactor, in which a 3- to 3.5-valent vanadium solution is produced from the 4-valent vanadium solution by a catalytic reaction in the presence of a reducing agent, which generates a gas product during oxidation, and capturing the gas product of the catalytic reaction with gas bubbles, followed by subjecting the gas product to gas-liquid phase separation from the reaction solution of the catalytic reaction, thereby accelerating the catalytic reaction towards the forward reaction; and a third step of purging a second vessel for supplying a 3- to 3.5-valent vanadium solution accommodating a 3- to 3.5-valent vanadium solution with a mixed gas of the inert gas and the gas product of the catalytic reaction captured with gas bubbles by the inert gas in the second step, which escaped to the exterior of the catalytic reactor in a gas state, to prevent oxidation of the 3- to 3.5-valent vanadium solution, followed by discharging the mixed gas to the exterior of the second vessel.

2. The method of claim 1, wherein the 4-valent vanadium solution is supplied to the catalytic reactor of the second step from the first vessel for supplying a 4-valent vanadium solution, in which the oxidation is prevented by an inert purge gas in the first step, and the 3- to 3.5-valent vanadium solution produced in the catalytic reactor of the second step is supplied to the second vessel for supplying a 3- to 3.5-valent vanadium solution of the third step.

3. The method of claim 1, wherein, in the second step, the inert gas supplied to the catalytic reactor captures the gas product of the catalytic reaction, thereby gradually increasing the size of the gas bubbles, while reducing the surface area and density of the gas bubbles.

4. The method of claim 1, wherein the gas product of the catalytic reaction, which is captured with gas bubbles by the inert gas, and the 3- to 3.5-valent vanadium solution produced in the catalytic reaction in the second step are supplied to the second vessel for supplying a 3- to 3.5-valent vanadium solution from the catalytic reactor and subjected to gas-liquid separation, and the second vessel for supplying a 3- to 3.5-valent vanadium solution is purged with the mixed gas of the inert gas and the gas product of the catalytic reaction to prevent oxidation of the 3- to 3.5-valent vanadium solution, followed by discharging the mixed gas to the exterior of the second vessel.

5. The method of claim 1, wherein the gas product of the catalytic reaction is captured with the inert gas by mixing of gases in the step 2 to allow the gas product to escape to the exterior in a gas state, and thus the gas product is moved upwards in the catalytic reactor and discharged to the exterior of the catalytic reactor at a higher rate than the 3- to 3.5-valent vanadium solution in a liquid state, which is the product of the catalytic reaction.

6. The method of claim 1, wherein the catalytic reaction of the second step is represented by Reaction Scheme 1 below, Reaction Scheme 2 below, or both:

[Reaction Scheme 1]

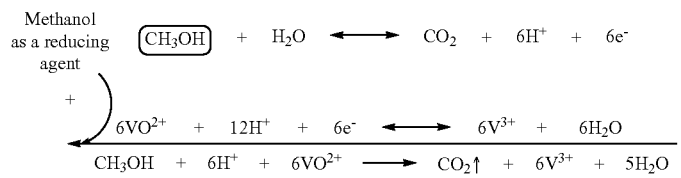

[Reaction Scheme 2]

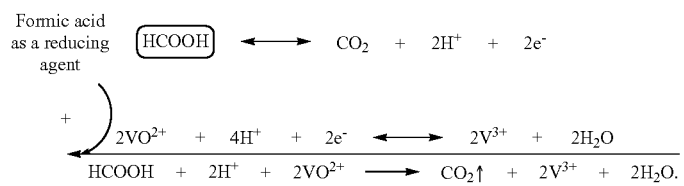

7. The method of claim 1, wherein the inert purge gas in the first step is nitrogen, and the gas product of the catalytic reaction in the second step is carbon dioxide.

8. The method of claim 1, wherein the second vessel for supplying a 3- to 3.5-valent vanadium solution is an air-tight vessel, wherein the 3- to 3.5-valent vanadium solution produced in the catalytic reactor, and the mixed gas of the inert gas and the gas product of the catalytic reaction, which escaped to the exterior of the catalytic reactor, are supplied to the second vessel for supplying a 3- to 3.5-valent vanadium solution, and the second vessel for supplying a 3- to 3.5-valent vanadium solution is purged with the mixed gas, thereby producing a purged 3- to 3.5-valent vanadium solution in the second vessel, while containing the mixed gas and the 3- to 3.5-valent vanadium solution in the air-tight vessel in a state of being subjected to gas-liquid separation.

9. The method of claim 1, wherein the first step to the third step are carried out in a continuous process in terms of gas flow.

* * * * *